Dec. 27, 1932.  B. STOCKFLETH  1,892,176
METHOD OF MAKING A BIMETAL BEARING SLEEVE
Filed March 1, 1930  2 Sheets-Sheet 1
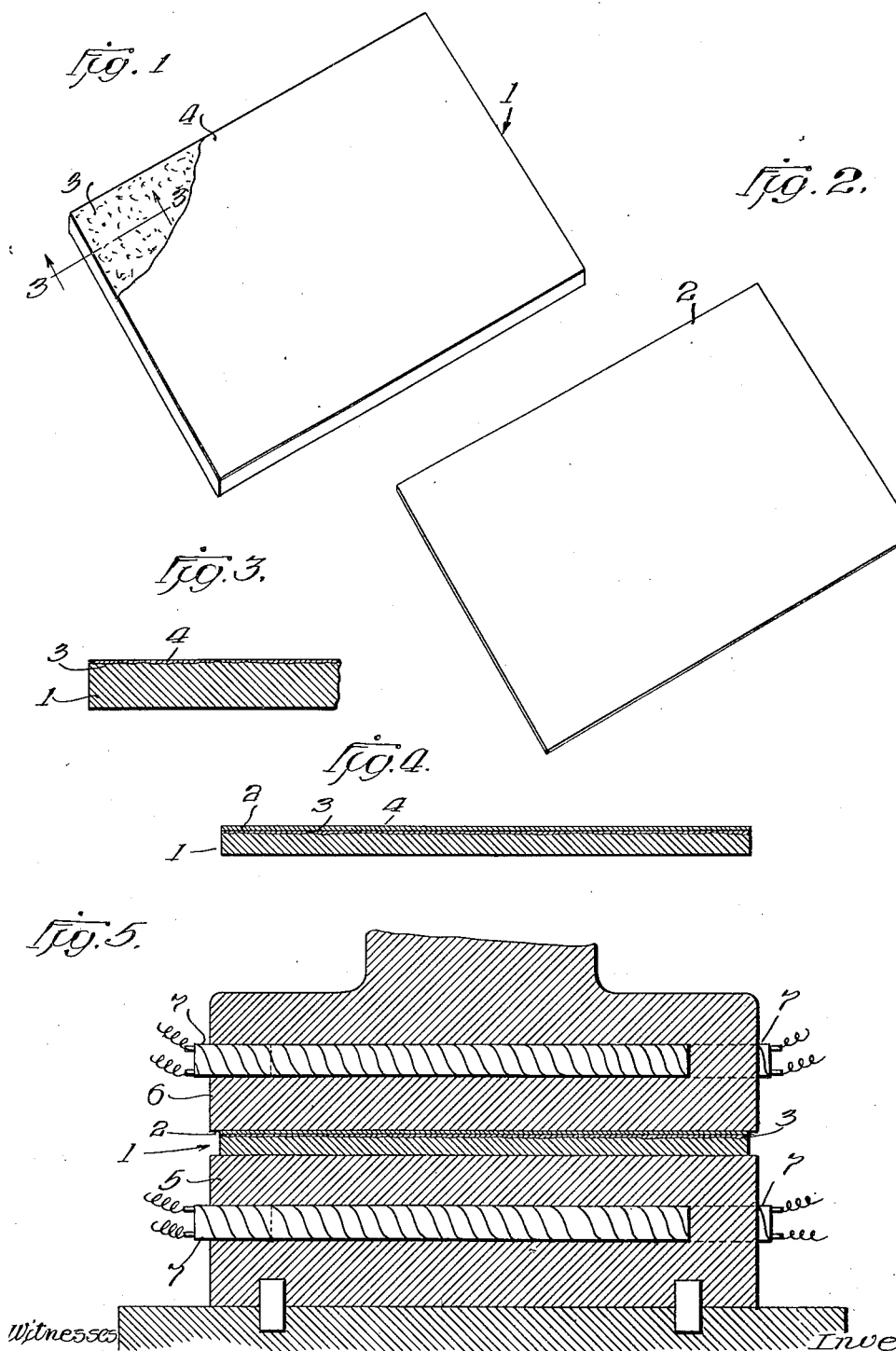

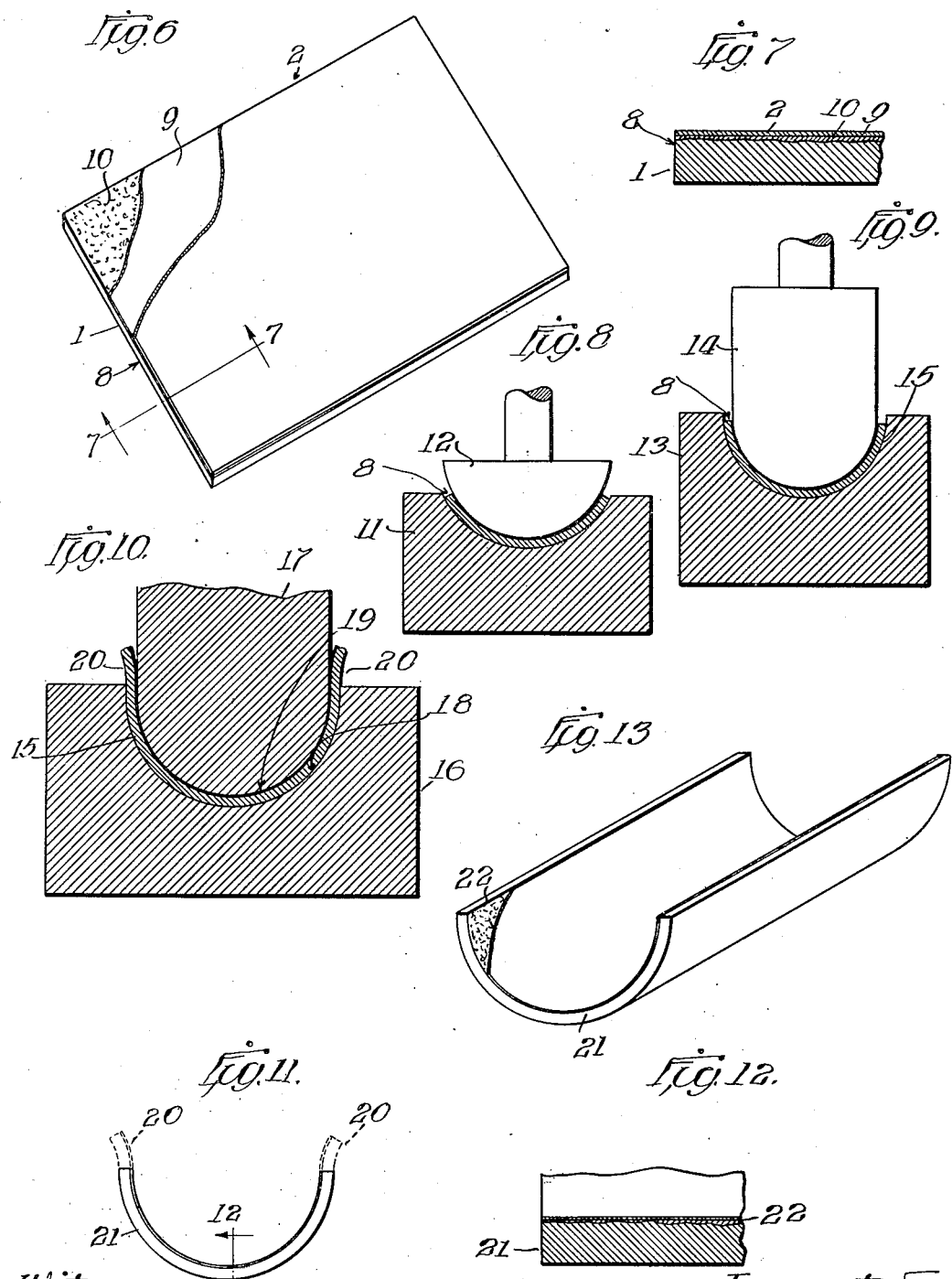

Patented Dec. 27, 1932

1,892,176

UNITED STATES PATENT OFFICE

BERGER STOCKFLETH, OF NILES, MICHIGAN, ASSIGNOR, BY MESNE ASSIGNMENTS, TO THE CLEVELAND GRAPHITE BRONZE COMPANY, OF CLEVELAND, OHIO, A CORPORATION OF OHIO

METHOD OF MAKING A BIMETAL BEARING SLEEVE

Application filed March 1, 1930. Serial No. 432,506.

This invention relates to improvements in the process of manufacturing bearing sleeves of the kind known as bi-metal sleeves. That is, a relatively thin walled sleeve having a relatively harder metal back, such as steel, bronze, etc., and a relatively softer bearing metal lining such as babbitt metal, or the like.

One important idea in connection with the use of such sleeves is that they are replaceable when worn slightly and as the wearing away of a very few thousandths of the thickness of the bearing metal ends the usefulness of the sleeve, it is a desirable economy to reduce the original thickness of the bearing metal, which is the more expensive, to a minimum. This minimum is preferably only slightly more than the allowable wear, just sufficient in fact so that the shaft which runs in the bearing will not come into contact with the harder metal back.

The object of this present invention is to provide a simple process by which such bearings can be produced.

This invention is related to that disclosed in my co-pending application on bearings and method of producing same, filed February 11, 1929, Serial No. 339,170, and wherein a method of accurately sizing and finishing bearing sleeves by what is termed the pressure method is described. The pressure method pre-supposes the provision of bi-metal bearing sleeves of approximately the shape and dimensions required in the finished sleeves and then the accurate sizing and finishing of these rough blanks by means of suitable dies in which the blanks are subjected to a tremendous forming pressure.

The present method involves the production of blanks each having a part which will later be the sleeve back and a part which will later be the bearing metal lining, the two associated and brought together to form a unitary blank having the back and the lining approximately of the relative thickness as in the finished sleeve but preferably both slightly thicker than in the finished sleeve.

It should be remembered that in the production of bi-metal bearing sleeves, the lining must be effectively bonded to the back throughout the whole contacting area and one of the objects of this present invention is to produce a substantially perfect bond.

In the production of such blanks, I have found that the following method has many important and valuable advantages.

I first produce flat harder metal blanks for the backs having at least one side, that which will later be the inside, thoroughly roughened to assist in the production of the desired bond. I then coat at least this roughened face of the flat blank with a suitable bonding metal, such as tin. I also prepare the bearing metal for the linings in very thin sheets preferably but a few hundredths of an inch thick. Preferably, the flat blanks of the backing metal and for the lining are of the same size. I then assemble a prepared backing blank and a lining blank together, that is, the thin lining blank on the backing blank and I place these two thus assembled between flat hot sweating dies. The dies are hot enough to cause the bonding metal to melt and the dies are pressed together to cause the thin sheet of bearing metal to be forced into intimate and perfect contact with the prepared back blank. In the process of manufacture, the blank plates that is the backs and the lining sheets may be and preferably are pre-heated before they are assembled for placement between the sweating dies.

After the flat bi-metal blanks are thus prepared they are first roughly formed to shape in suitable forming dies. At this stage the roughly formed sleeves are slightly greater in thickness than the finished sleeves. They are then formed and sized in suitable dies by pressure, the sleeves being made thinner radially and elongated circumferentially in this operation. Incidentally, they are also lengthened, under the forming pressure to which they are subjected. This forming pressure first causes the complete filling of the die space, then the compression of the metal of the sleeve and then the excess metal, if any, is forced out of the die space, in other words, the surplus metal is extruded.

The pressure finishing and sizing step made use of herein is substantially the same as that described in my co-pending application supra with possibly the difference that proportionally less bearing metal is extruded on account of its relative thinness to start with.

This method of forming the blanks makes the bearing metal not much more than a substantial coating on the inner surface of the sleeve but it is of ample thickness for the purpose, that of providing sufficient thickness to permit the allowable wearing away in use.

The invention will be more readily understood by reference to the accompanying drawings forming part of this specification and in which:—

Fig. 1 is a perspective view of one of the prepared sheets or blanks for the backs;

Fig. 2 is a similar view of one of the prepared sheets of bearing metal for the lining;

Fig. 3 is an enlarged fragmentary section on the line 3—3 of Fig. 1;

Fig. 4 is a longitudinal sectional view showing the two prepared sheets assembled ready for insertion into the press;

Fig. 5 is a diagrammatic, vertical, sectional view of a press showing the assembled sheets therein;

Fig. 6 is a perspective view of a finished flat blank, parts being broken away to best illustrate the invention;

Fig. 7 is an enlarged sectional view on the line 7—7 of Fig. 6;

Fig. 8 is a sectional view similar to Fig. 5 and showing the first step in forming the flat sheet blank into a half-cylindrical bearing sleeve;

Fig. 9 is a view similar to Fig. 8 and showing the completion of the rough half-cylindrical blank;

Fig. 10 is a fragmentary vertical sectional view of a press illustrating the step of completing the bearing sleeve, viz. forming and accurately sizing it by the application of a heavy pressure;

Fig. 11 is an end view of a completed bearing sleeve, the parts extruded in the press shown in Fig. 10 being indicated by dotted lines;

Fig. 12 is an enlarged sectional view of the completed bearing sleeve on the line 12—12 of Fig. 11; and Fig. 13 is a perspective view of the completed bearing sleeve, part of the lining being broken away for illustrative purposes.

In said drawings 1 is a rectangular piece of sheet metal, such as steel, bronze or brass, of proper dimensions for use as the backing shell of a bearing sleeve, and 2 is a similar piece of very thin, flat sheet metal suitable for the lining member of said bearing sleeve. It should be understood that it is impracticable to show the sheet 2 in its relative thickness as it is preferably only a few thousandths thick.

The blank 2 has been prepared for use as a backing member by first being roughened upon one flat surface, as indicated at 3, to provide said surface with sharp projections and pits to serve as a mechanical bonding means for the lining metal. In addition to this roughening, the blank 2 has also been covered at least on its roughened surface with a coating of tin or other suitable bonding metal, as indicated at 4. The roughening of the blank 2 is preferably accomplished by what is known as the "shot blasting method", viz. the driving against the surface to be roughened of small angular particles of hardened steel by means of a strong blast, sufficient to cause the hardened particles to produce small pits and alternate projections. Needless to say that the whole surface to be used is thus treated and this assists in producing a 100% bond between the lining and the back. In applying the tin 4 to the blank, the pits in the roughened surface are filled by the tin and the projections are covered.

After the back 1 and lining 2 have been prepared, they are assembled as shown in Fig. 4 and are then placed in a press having flat faced pressing heads 5 and 6. Preferably, the backing member at least is heated before the assembly, the temperature being sufficient to just melt the bonding tin.

After the blanks are assembled and placed in the press, the heads 5 and 6 are pressed together, thus pressing the lining member 2 tightly upon the backing member 1 and into contact with the bonding metal 4.

Preferably, as shown, the heads 5 and 6 are maintained hot as indicated by electric heating devices 7 inserted into openings in the heads.

The pressure applied is sufficient to force the lining member 2 down upon the roughened surface of the backing member 1 and upon the bonding metal, resulting not only in a mechanical bonding of the lining to the back, but also a thorough molecular bonding by the amalgamation of the lining metal with the tin.

The completed flat blank 8 is shown in Fig. 6, the lining and the bonding tin being broken away as shown at 9 and 10 to show the construction of the blank, likewise this construction is well illustrated in the sectional view shown in Fig. 7.

After the flat blank 8 has been completed as described, it is ready to be formed into a half-cylindrical bearing sleeve. It is first partly formed, as shown in Fig. 8, by suitable die members 11 and 12 and is finished in a rough condition in a second operation, illustrated in Fig. 9, by the die members 13 and 14 and designated 15. As shown, the roughly formed half-cylindrical sleeve 15 is preferably slightly less than a complete half-cylinder.

This roughly formed half-cylindrical blank 15 is then subjected to a very heavy forming and sizing pressure between a die member 16 and a plunger 17. The die 16 has a die groove 18 formed to produce the shape and size of the outer surface of the finished sleeve, and the plunger 17 has its co-operating end 19 formed to produce the shape and size of the inner surface of the finished sleeve.

In making the rough blank 15, I purposely make at least the back member thicker than is necessary in the completed sleeve so as to provide an excess of metal. The pressure to which the sleeve is subjected in the finishing operation is sufficient to cause the metal of the sleeve to flow, the excess metal being extruded at the longitudinal edges of the sleeve between the two die members, as illustrated at 20, Fig. 10. In such flow and extrusion, the lining being of such thinness and so completely bonded to the back, it is to all practical purposes part and parcel of the back and though softer than the back, it flows with the back and not in advance thereof. Consequently, in the completed sleeve the lining is thoroughly and completely bonded to the back for purposes of use as though it were the back metal and not a separate metal.

Later the extruded portions 20 are removed by any suitable means, as indicated by dotted lines in Fig. 11, leaving an exact half-cylindrical shell 21 or as near such as may be desired for the particular use.

In Fig. 13 I have shown a perspective view of a completed sleeve, the lining broken away as indicated at 22.

In Fig. 12 I have shown a sectional view of the completed sleeve to best illustrate the fact that the bond produced in the operation shown in Fig. 4 is preserved if not improved by the several operations in forming the finished sleeve out of the flat blank 8.

As the back member comprises about 95% of the metal of the sleeve, and as the backing metal is relatively low in cost compared to the lining metal, it will be understood that by this improved method of manufacture I am enabled to greatly reduce the cost of such sleeves.

Besides the advantage of economy or low cost of production, many other advantages follow from this method of manufacture. To enumerate some of the more prominent:

The tremendous pressure to which the rough sleeve is subjected in the pressure forming step and which results in the actual flowing and thinning of the metal of the sleeve, compresses or densifies the metal to a condition far beyond any such action which can occur in use, hence the finished sleeve is in a sense permanent in form; further, such condensation or densification results in a better condition for the transmission of heat away from the bearing and hence cooler running.

The manipulation of the metal of the back in the final pressure forming step, that is, its compression, thinning and elongation is similar to that produced by forging or hammering, that is, the metal is improved and toughened in texture which tends to improve the several functions of the bearing sleeve.

The back being such a large proportion of the thickness and the lining such a small proportion greatly assists the dispersion of the heat of running.

An important advantage resides in the fact that the internal structure of the lining metal as produced in the original sheets is preserved in the finished sleeve as the heat applied in manufacture is not sufficient to change this structure, further the wearing surface of the sleeve is the surface of the prepared sheet of lining material and whatever advantages this may originally possess are preserved and improved in the final finished sleeve.

In other words, the inner wearing surface of the sleeve is the original skin of the prepared bearing metal sheet and as such thin sheets of the bearing metal can only be produced by some pressure method such as rolling, the skin has certain advantageous features which it is of great advantage to preserve in the final bearing.

It is to be noted that such a sleeve with its advantages as described could not be produced by any method which involved the finishing of the wearing surface by cutting methods, such as boring, which removed any appreciable thickness of the bearing metal.

As many modifications of the invention will readily suggest themselves to one skilled in the art, I do not limit or confine the invention to the specific steps or structures herein shown and described except within the scope of the appended claims.

I claim:

1. The herein described method of making a bi-metal bearing sleeve, which consists in preparing a flat blank of sheet metal suitable for the backing part of the sleeve, and a thin sheet of the bearing metal of substantially the same rectilinear dimensions, roughening one side at least of the backing blank, coating the roughened side at least of the backing blank with a suitable bonding metal such as tin, and pressing the bearing metal blank upon the roughened and tinned surface of the backing blank between flat metallic surfaces of at least the dimensions of the pieces to be pressed, while the two are pressed together and held quiescent heating them at least to a temperature at which the bonding metal will melt, preforming the blank roughly into a substantially half-cylindrical form, and then sizing and finishing the sleeve by applying pressure thereto radially sufficient to thin the sleeve radially and elongate it in a direction substantially parallel to the die surfaces.

2. The invention as defined in claim 1, and including the step of preheating the backing blank before the two blanks are pressed together.

3. The invention as defined in claim 1, and including the step of preheating the two parts of the flat blank before they are pressed together.

In witness that I claim the foregoing as my invention, I affix my signature this 26th day of Feb., 1930.

BERGER STOCKFLETH.